United States Patent [19]

Bariol et al.

[11] 4,409,822

[45] Oct. 18, 1983

[54] IONIC PICKUP FOR THE TRANSIT TIME BETWEEN AN EMISSION AREA AND A RECEIVING AREA

[75] Inventors: Roger Bariol, Olivet; Jackie Lecomte, Orleans; Jean-Marie Bouvet, Boulogne Billancourt, all of France

[73] Assignee: Regie Nationale des Usines Renault, Boulogne-Billancourt, France

[21] Appl. No.: 306,761

[22] Filed: Sep. 29, 1981

[30] Foreign Application Priority Data

Sep. 30, 1980 [FR] France ................................ 80 20896

[51] Int. Cl.³ ............................................ G01M 15/00
[52] U.S. Cl. .................................... 73/118; 73/861.09
[58] Field of Search ..................... 123/438; 73/861.07, 73/861.09, 118, 116, 861.05, 861

[56] References Cited

U.S. PATENT DOCUMENTS

| | | | |
|---|---|---|---|
| 3,693,436 | 9/1972 | Gildner | 73/861.05 |
| 4,127,029 | 11/1978 | Murtin | 73/861.09 |
| 4,144,750 | 3/1979 | Read | 73/861.09 |
| 4,152,935 | 5/1979 | Nagaishi et al. | |

FOREIGN PATENT DOCUMENTS 2389103 11/1978 France .
2439302 5/1980 France .

*Primary Examiner*—Jerry W. Myracle
*Attorney, Agent, or Firm*—Oblon, Fisher, Spivak, McClelland & Maier

[57] ABSTRACT

An ionic transducer for measuring the transit time of stream of ionized particles produced at an emission station and flowing towards a receiving station, which is used for controlling the richness of the air-fuel mixture fed into an internal combustion engine. At the receiving station is disposed a receiving device including a receiving grid on which a signal is induced upon passage of the ionized stream of particles. The receiving grid is situated between two other grids connected to ground and serving as shielding and airflow stream stabilizer. The several grids are movable and adjustable with respect to the direction of the stream of ionized particles.

6 Claims, 7 Drawing Figures

IONIC PICKUP FOR THE TRANSIT TIME BETWEEN AN EMISSION AREA AND A RECEIVING AREA

BACKGROUND OF THE INVENTION

1. Field of the Invention

The present invention concerns an ionic transducer for measuring the transit time between an emission area and a receiving area, associated with electronic processing equipment, and more particularly a transducer for measuring the volume flow of a stream of gas by using ionized particles as a reference.

The transducer of the present invention is of the transit-time anemometer type; it is designed for measuring an air flow with a view to controlling the richness of the air-fuel mixture fed into an internal combustion engine.

2. Description of the Prior Art

The principle of transit-time anemometers consists in using a cloud of ions as a moving body induced to travel at the same velocity as the gas flow, with the time it takes the cloud to pass between an emission device and a receiving device being measured. The emission device is generally a device (a point or wire) which receives a short, high-voltage impulse and therefore induces localized ionization. The cloud of ionized gas thus formed induces a signal by its influence when it passes through a receiving device.

In many cases, the application of this principle poses difficulties.

On the one hand, the time measured between emission and reception is replete with errors because the phenomenon of ionization is taking place during only part of the duration of the high-voltage impulse; the phenomena of ionization and movement of the stream of gas are superimposed.

On the other hand, the high-voltage impulse (several kilovolts) on the emission device induces a very high voltage on the receiving device by virtue of direct radiation; this is superimposed over the real induced signal and threatens to destroy the electronic system set up in order to amplify the said induced signal.

Moreover, the geometric position of the emission system in the stream of gas causes vortices and wakes, thus destabilizing the signal received and constituting an additional error factor.

Finally, it is known that the flow of air in the intake manifold of a thermal engine is pulsating rather than continuous, i.e., that over the average value of $Qv_{moy}$ is superimposed a variable sinusoidal value whose frequency is twice that corresponding to the motor's velocity of rotation. It is hence necessary in this case for the measurements taken by the transducer to be carried out at particular instants which correspond to the passage of the pulsating flow at the average value $Qv_{moy}$. To do this, it is therefore necessary to use an electronic control device which observes these operating conditions.

SUMMARY OF THE INVENTION

The present invention makes it possible to avoid the above-mentioned drawbacks with respect to the transducer and to utilize an electronic device which permits the direct measurement of the average value $Qv_{moy}$ of a pulsating flow.

The embodied structure of the transit-time ionic transducer associated with an electronic device makes it possible to obtain an electrical magnitude in the form of a pulse whose width is dependent on the volume flow $Qv$ in accordance with the linear equation $1/t = K \cdot Qv_{moy}$, in which K is a constant. Moreover, the aim of the invention is a receiving device relating to the transducer which makes it possible both to avoid the influence of the high voltage and to improve the quality of the aerodynamic stream, thereby making it possible to obtain stable electrical signals.

According to the invention, the structure of the receiving device includes a receiving grid on which the induced signal appears, the grid being situated between two other grids connected to ground and forming a jacket. One of these grounded grids is upstream from the receiving grid and also serves as a filter and stream stabilizer.

The electronic device associated with the transducer according to the invention entails, as regards the emission device:

a high voltage short pulse generator which may be triggered externally;

an angular reference system for determining the mechanical position of the engine's crankshaft;

a microprocessor system which makes it possible to trigger the high voltage pulses with retarded timing with respect to the position of the crankshaft in accordance with a clearly defined law, hereinafter called the angular displacement law.

In addition, the electronic device associated with the transducer entails, as regards the receiving device, an amplifier stage followed by a squaring stage as well as a correction device making it possible to obtain a rectangular output signal whose width depends on the average volume flow in accordance with a linear relationship.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
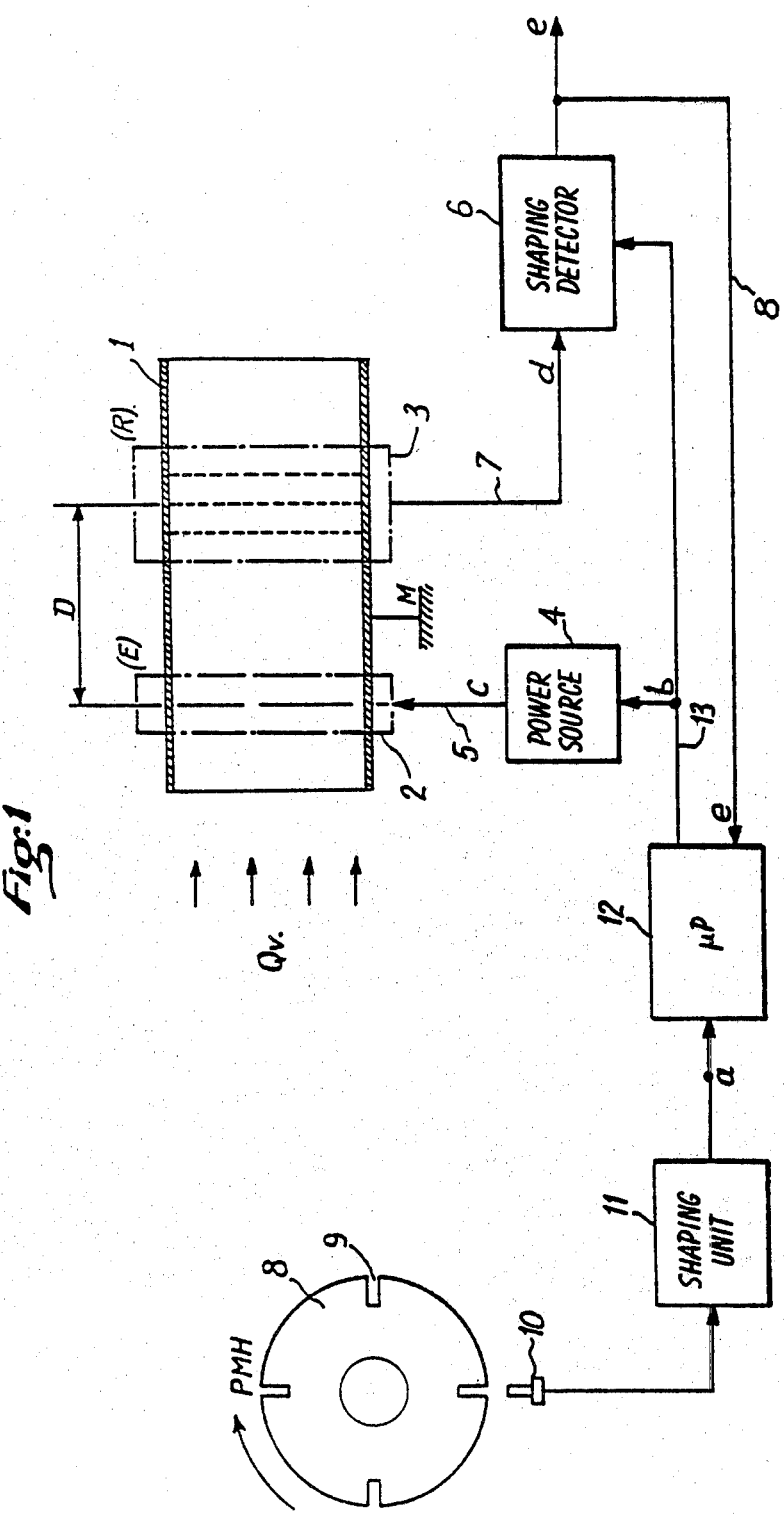
FIG. 1 is a synoptic block diagram of an ionic flow transducer associated with electronic processing equipment.

Referring now to the drawings, wherein like reference numerals designate identical or corresponding parts throughout the several views, and more particularly to FIG. 1 thereof, in FIG. 1, the ionic transit-time transducer consists of a metallic envelope 1, grounded by means of connection M, inside of which is circulating the gas with a volume flow Qv. The metallic body 1 includes two functioning areas: an emission area (E) designated with reference number 2 and a receiving area (R) designated with reference number 3, separated by distance D.

The emission area 2 of the transducer is supplied with a high-voltage pulse C from a power source 4 via connection 5.

The receiving area 3 of the transducer gives off a signal d to a device 6 through connection 7.

Figure 6:
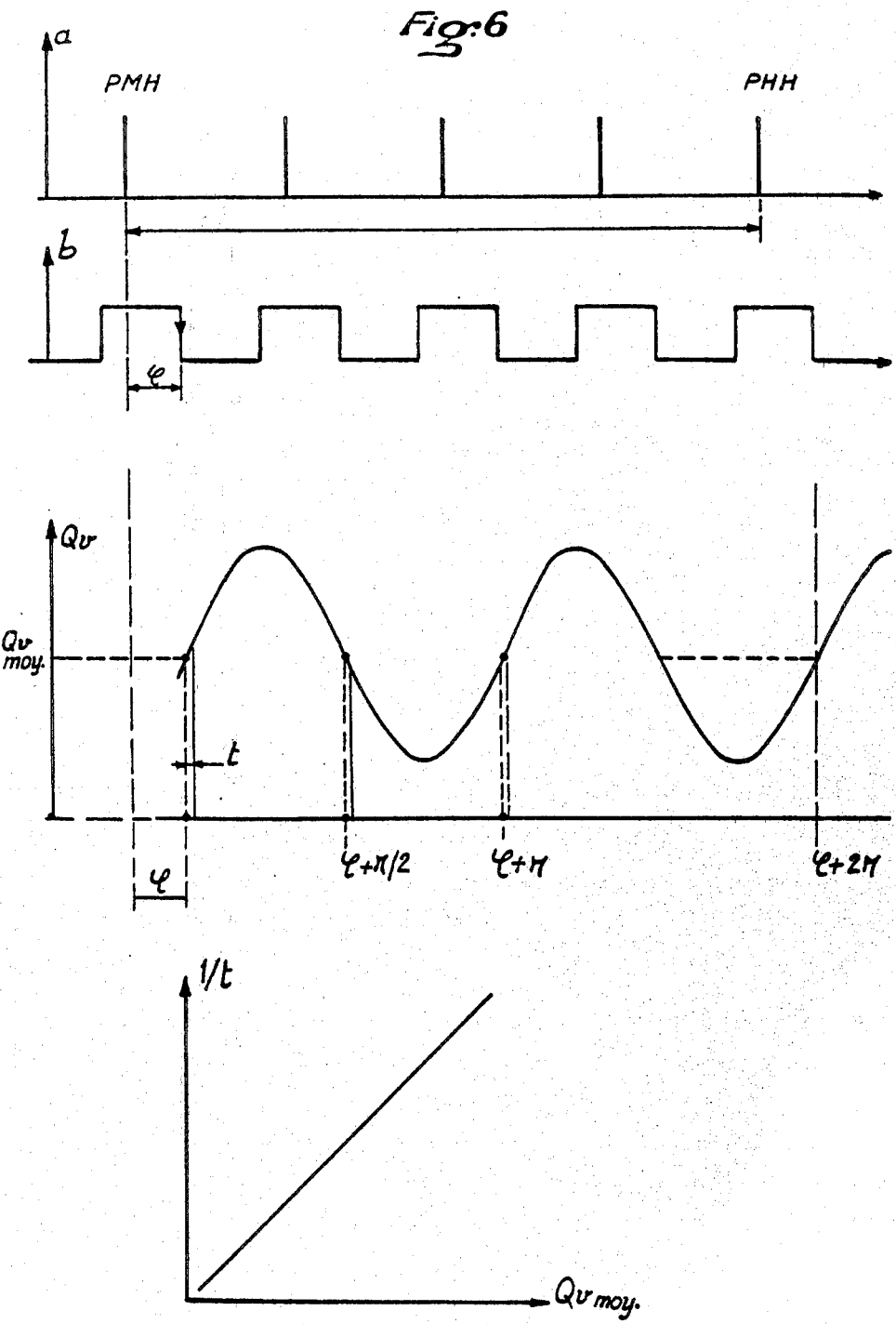
FIG. 6 is a timing diagram which illustrates the shape of the signals at different points of the diagram of FIG. 1.

This device 6 at its output gives off, at connection 8, a signal e for time t which is proportional to the flow Qv in accordance with the curves in FIGS. 4 and 6, which shall be explained below.

A flywheel 8 made of a piece with the engine crankshaft features four equidistant notches 9. These notches 9 are detected by a position detector 10 which feeds a shaping unit 11. At the output of the unit 11, there are pulses a with a spacing which corresponds to one fourth of one crankshaft rotation. These pulses are then retarded by a microprocessor device 12 and in accordance with a retarding law called the angular displacement law, are then transmitted through a connection 13 to the input of devices 4 and 6. These pulses having angular displacement with respect to the signals a bear reference letter b.

The position detector 10, the shaping power source 11 and the unit 4 delivering the high voltage pulses are known to specialists and already in use in automobile electronics. They will not be further described in the remainder of the text.

Figure 2:
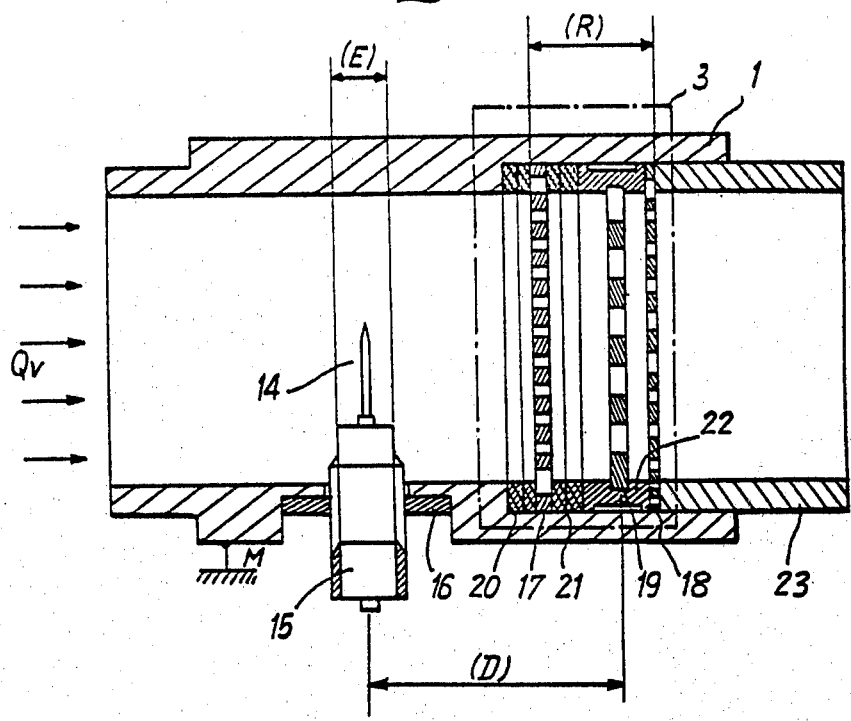
FIG. 2 is a longitudinal cross-sectional of the ionic transducer according to the invention.

The schematic representation of FIG. 2 shows the parts making up the emission area (E) and receiving area (R) represented in FIG. 1.

The emission area (E) consists of an ionization system 14 which uses the point effect well known to specialists. This system 14 is maintained in the gas stream by means of an insulating crossmember 15 screwed into the metallic body 1 and kept from rotating by a screw 16.

The receiving area (R) consists of two grids 17 and 18 situated one on each side of the receiving grid 19.

Grid 17 has the form of a metallic fine-mesh grid between two metallic shims 20 and 21. This grid plays a dual role. Firstly, it serves as electrostatic shielding between the receiving grid 19 and the emission system 14. Consequently, the grid 19 is not influenced by the prevailing electric field between part 14 and the inside part of the grounded transducer body 1. Secondly, grid 17 has a fine mesh weave which makes it possible for it to disrupt and break down the vortices caused by the wake from the central body 14 and the portion of the insulating crossmember 15 inside the transducer. Grid 17 hence serves as a regulator of aerodynamic flow, which improves the stability of the electrical signal created by the influence of the ion cloud when it passes grid 19.

Grid 18, situated downstream from grid 19, likewise consists of a fine-mesh metallic grid of the same type as that of grid 17 described above. Grid 18 serves as electrostatic shielding with respect to receiving grid 19; it likewise makes it possible to improve the shape of the signal induced on the receiving grid.

Figure 2A:
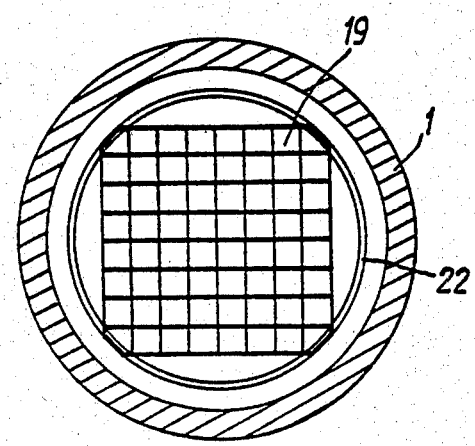
FIG. 2a is an end view of the ionic transducer according to the invention.

The receiving grid 19, as represented in FIG. 2a, is likewise a grating with a larger mesh than the ones used in the shielding grids 17 and 18. This grid 19 is embedded in an insulating ring 22 and is connected electrically to an output outlet, not represented in the figure, thereby making it possible for the induced signals to be sent out. This grid 19 is kept within the ring 22 at four holding points as represented in FIG. 2a so as to reduce parasite capacities as much as possible. It bears noting that this grid 19, on which an electrical signal is induced by the influence of a moving cloud of ions, need not necessarily be circular in shape.

The metallic shims with references 20 and 21, situated on each side of the first shielding grid 17, make it possible to adjust the distance (D) between the emission system (E) and the receiving system (R).

The receiving system (R) consisting of metallic grids 17, 18 and 19 is held in place by a metallic socket 23 inserted into the body 1 and thus constituting the other end of the transducer.

Figure 3:
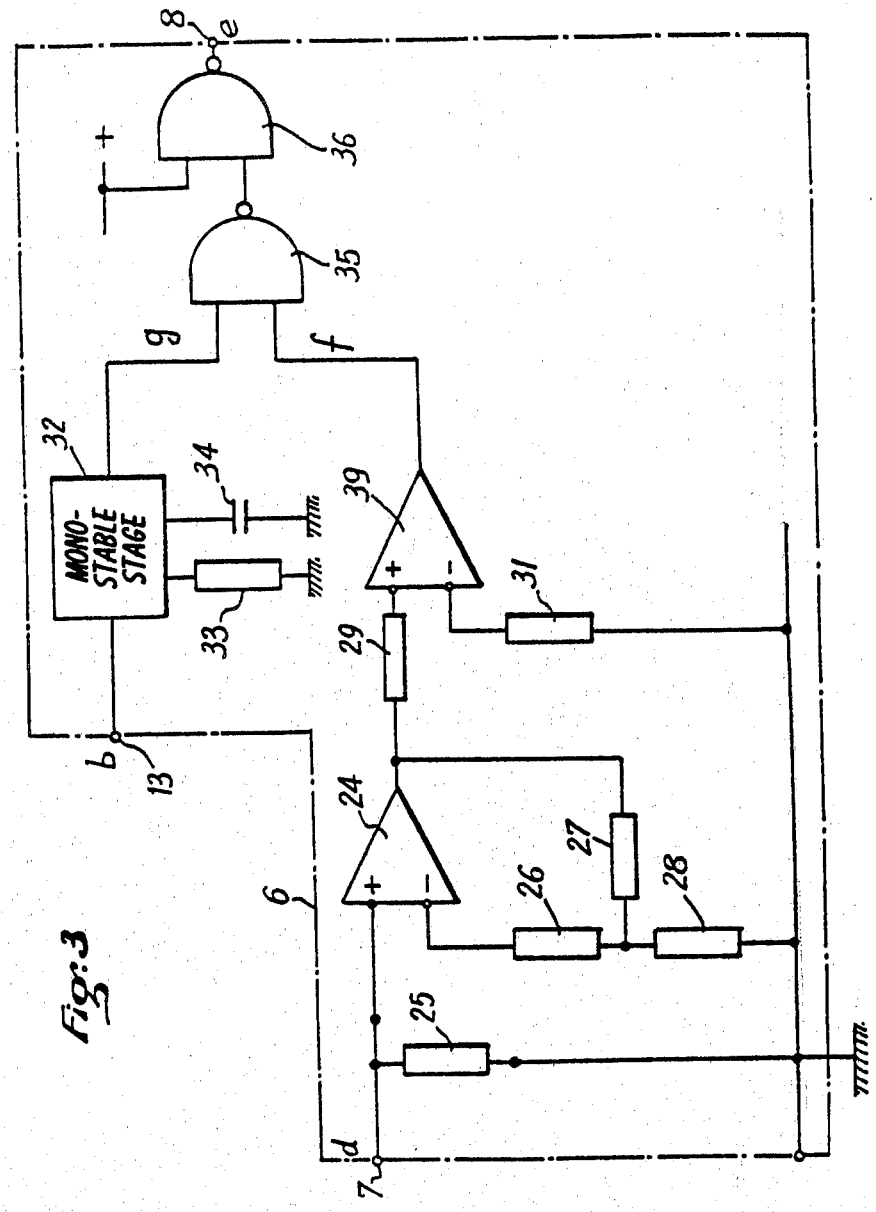
FIG. 3 is a schematic representation of the electronic device detecting the passage time of the ionized cloud.
Figure 4:
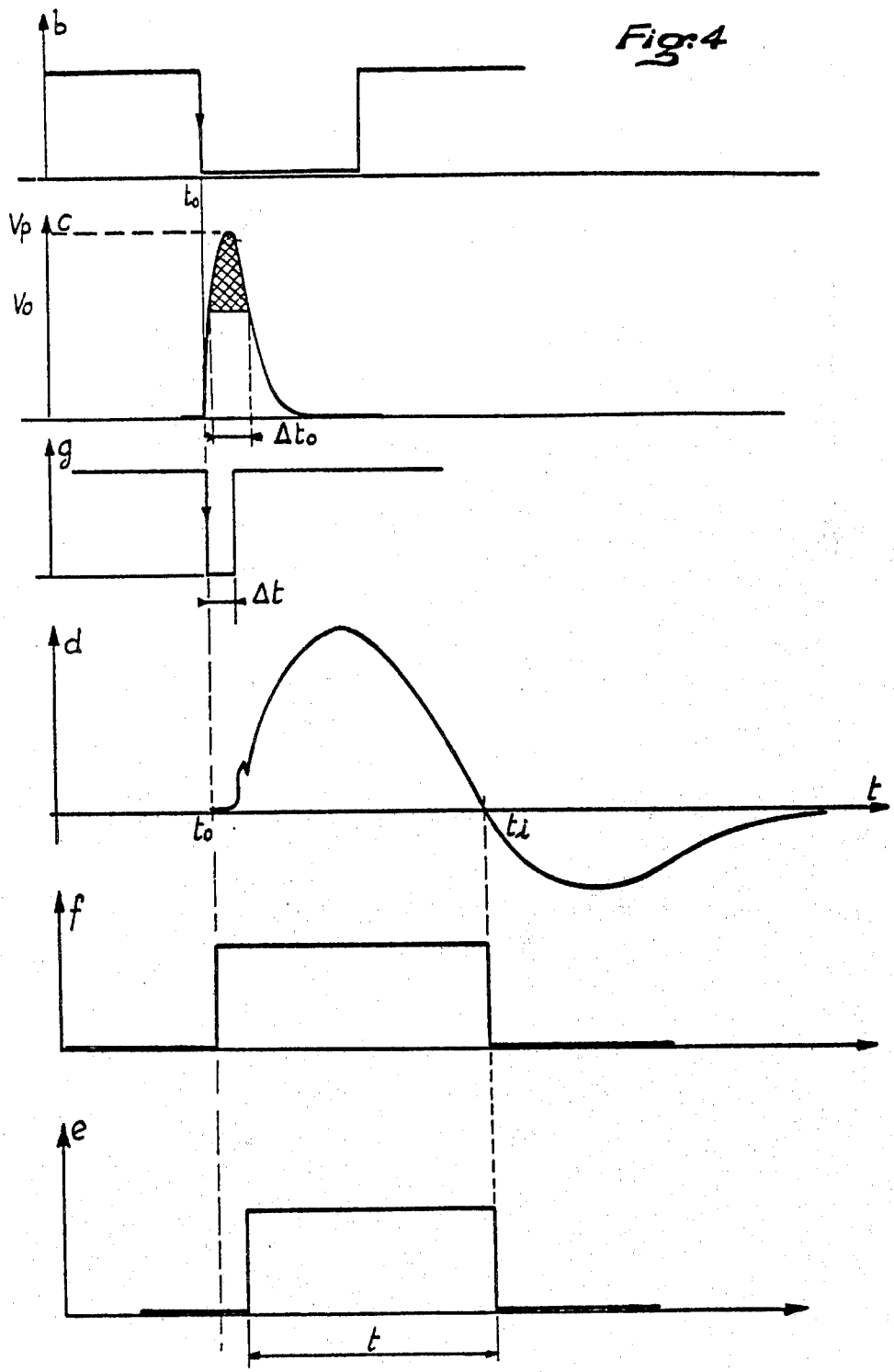
FIG. 4 is a timing chart which illustrates the shape of the signals obtained at different points of the block diagram of FIG. 1.

FIG. 3 schematically represents the key elements of device 6 of FIG. 1 which gives off a signal with reference e in FIG. 4 at its output.

The signal obtained on the receiving grid 19 and referenced d in FIG. 4 is transmitted by connection 7 to the positive terminal of an operational amplifier 24. The input impedence of this part 24 is determined by resistors 25 and 26. The gain of the amplifier 24 depends on resistors 27 and 28. The amplified signal from part 24 is transmitted to an amplifier with reference 39 through a resistor 29 connected to the positive terminal. The negative terminal of amplifier 39 is connected to ground through a resistor 31, whereby a squaring stage is realized. At the comparator output 39, a signal with reference f in FIG. 4 is obtained. If $t_o$ is taken to be the time origin, i.e., the instant at which the command order is sent from the high-voltage module, referenced b, and if we take $t_1$ as the instant when the signal picked up on the grid 19 and referenced d passes through zero, the width of the signal referenced f is thus $t_1 - t_o$. The signal referenced c in FIG. 4 represents the high-voltage pulse sent by the emission system 14. The ionization induced by this high voltage in reality occurs only during a time period $\Delta t_o$ corresponding to a high voltage above a threshold $V_o$. There is hence a lag between the high-voltage command order and the actual creation of a cloud of ions during a time period $\Delta t_o$. The width of the signal with reference f and equal to $t_1 - t_o$ must therefore be corrected to take this ionization lag into account. The unit 32, made up of elements 33 and 34 and controlled by the order referenced b through connection 13 in FIG. 1, is provided to generate this lag.

Unit 32 is a monostable stage, of a known type, whose output signal g goes to the 0 state during a time period $\Delta t$ beginning at the time of command order b. The signals reference f and g, given off by 39 and 32 respectively, are sent two two successive "NAND" logic terminals 35 and 36. The output signal e, carried via connection 8 in FIG. 1, thus has the shape of a square signal of width $t = t_1 - \Delta t$. The lag phenomenon upon ion cloud emission is thus compensated for in measuring the real transit time. This arrangement thus makes it possible to have at the output a signal width t, function of the flow Qv in accordance with a strictly linear relationship $1/t = K \cdot Qv_{moy}$ as represented in FIG. 6.

Figure 5:
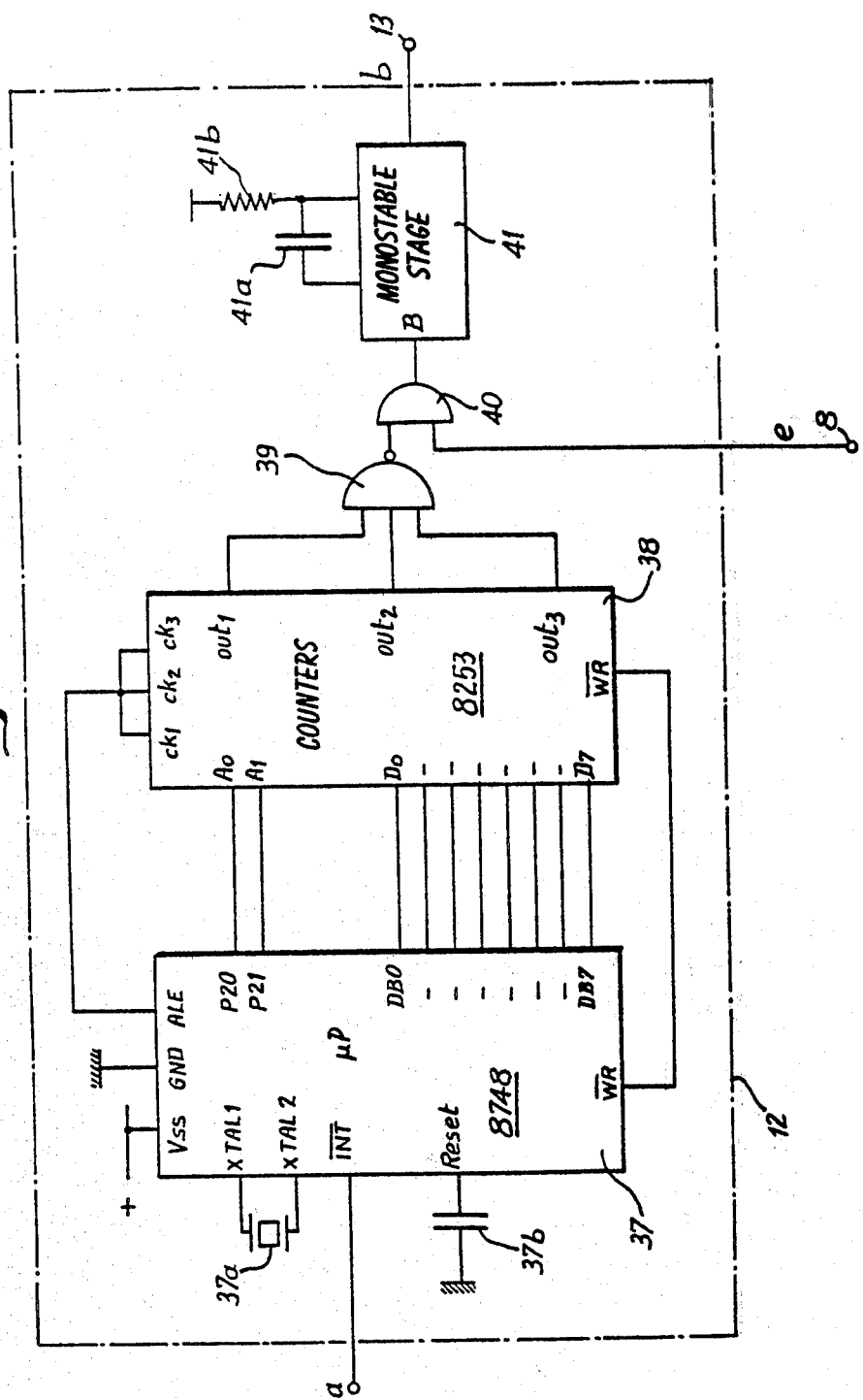
FIG. 5 is a schematic representation of the electronic device which makes it possible to feed the emission system on the basis of crankshaft velocity signals in accordance with the angular displacement law.

FIG. 5 schematically represents the key elements of unit 12 of FIG. 1. This unit 12 is set up to give off the signals referenced b which are angularly displaced in the retard direction by angle $\phi$ with respect to the signals given off by the engine flywheel and referenced a.

The retard angle $\phi$ generated by part 12 depends on the velocity of the engine flywheel according to a formula of the type $\phi = -\phi_o + kN$, where N is the engine velocity and k is a constant. Device 12 consists of four modules.

Module 37 is the principal element of the angularly displaced signal generation system. It is made up of a type 8748 microprocessor. The program memory of this microprocessor has a RAM memory necessary for calculating the retard angle and a counter. The program sequencing is provided by a quartz crystal oscillator referenced 37a. The part referenced 37b is a capacitor whose function is to give the microprocessor an initialization signal for applying voltage.

The retard angle to be generated depends on the engine velocity, so to calculate this retard the microprocessor must be constantly informed of the velocity. To do so, it has a counter which makes it possibly to quantify the time between two pulses from the engine flywheel referenced a. These pulses are applied on the INT input of the microprocessor and are active at the low level. The microprocessor continuously monitors this input. When passing to the low signal state, the microprocessor verifies the status of the signal a second time: if it is still at the low state, the signal referenced a is validated; if not, it is ignored and a new step is started over.

This procedure is necessary in order to eliminate possigle parasitic inputs. With each validated pulse, the counter is stopped; its contents correspond to the period of the engine flywheel signal. The latter is retained in memory and the counter is reset at zero, then retriggered for a new measurement. All that then remains is for the microprocessor to determine the angle. To do this in its memory it has a table of $\phi = -\phi_o + kN$ (where N is motor velocity). Thus the microprocessor need only read the retard angle from its memory with the help of the data contained in the counter. However, the number of points memorized is limited, it is hence necessary to carry out an interpolation calculation. The microprocessor then searches its memory for the lower and higher retard angles including the true retard angle corresponding to the period of the calculated engine velocity. By means of linear interpolation, from this it deduces the exact retard angle. This calculation completed, the microprocessor transmits the results to the module with reference 38. After this operation, the microprocessor begins another measurement and calculation procedure.

The role of module 38 is to retard the engine flywheel impulses. To do so, part 38 consists of three type 8253 integrated counters which are separately programmable.

The use of several counters is necessary because the retard angles generated are in excess of 90°; with three counters the maximum retards are 270°. The procedure for loading the counters is carried out under the control of the microprocesser, which transmits several items of data to module 38.

Microprocessor output WR is activated, thus informing module 38 that the microprocesser is about to transmit data. The outputs referenced P20 and P21 are activated and determine which counter to load; the data previously calculated by the microprocessor is finally transmited through outputs referenced DB0 to DB7, and the microprocesser eliminates the data at its output WR, thereby signaling to module 8253 that the loading procedure is completed. The counter selected is then decremented through a clock at its input CK and from the ALE output of the microprocesser.

When the counter in question passes through zero, its corresponding OUT output is activated by keeping it at a low level for one clock period (ALE).

The part referenced 39 is a "NAND" gate with three inputs whose role is to total the three OUT outputs from module 39 and invert the parity.

Part 40 is an AND gate with two inputs. At one of these it receives the output from module 39 and at the other the information referenced 3 which comes from module 6 in FIG. 1. The role of module 40 is to prevent the triggering of a new flow measurement if the one begun previously has not been concluded. This may occur when the flow is very slight and the engine velocity high (deceleration of the engine).

Module 41 is a known type of monostable unit. It provides a calibrated impulse referenced by elements 41a and 41b. This pulse is generated every time its input B is activated, and is transmitted to the high-voltage module 4 through connection 13 in FIG. 1.

The use of a microprocesser in unit 12 described above makes it possible to create retard angles of the form $\phi + f(KN)$ (where N is the engine velocity) of any type. However, the system may be simplified for a particular type of curve. In fact, the curve $\phi + -\phi_o + kN$ may be broken down into a constant phase $\phi_o$ plus a constant retard $t_o$.

This retard $t_o$ is actually a phase $\phi$ equal to:

$$\phi = 90 \frac{t_o}{t_{mot}} \quad (t_{mot} \text{ being the period of the engine velocity}).$$

We know that:

$$N = \frac{60}{4 \cdot T_{mot}} \quad \text{(corresponding to a target with four notches)}.$$

The equation thus becomes:

$$90 \frac{t_o}{t_{mot}} = k \frac{60}{4 \cdot T_{mot}}, \text{ hence:}$$

$$t_o = \frac{k}{60}.$$

The constant phase $\phi_o$ may be achieved mechanically by angularly displacing the engine flywheel pickup by an angle $\phi_o$.

The constant retard $t_o$ is achieved electronically on the basis of monostable type parts of a known type. These monostables, three in number, are triggered separately every third impules from the engine flywheel. Thus the use of the mircroprocesser referenced 37, and of the counters referenced 38, is no longer necessary.

Obviously, numerous modifications and variations of the present invention are possible in light of the above teachings. It is therefore to be understood that within the scope of the appended claims, the invention may be practiced otherwise than as specifically described herein.

We claim:

1. An ionic air-flow transducer for measuring the transit time of a stream of ionized particles between an emission station and a receiving station respectively associated with a high-voltage pulse generator and a detector, wherein a triggering mechanism, a shaping circuit and a control circuit related to the position of an engine crankshaft is used to obtain an electrical signal which depends on average volume flow (Qv), comprising:

the receiving station including shielding and flow regulation means which passes said stream of ionized particles and is disposed upstream and downstream of said detector for shielding said detector and regulating said air flow; and means for moving said detector and associated shielding and flow regulating means with respect to the direction of the steam of ionized particles;

wherein said shielding and flow regulation means comprises:

two fine-mesh metallic grids arranged in parallel on respective sides of the detector; and metallic shims for supporting said grids, said shims being longitudinally adjustable.

2. An ionic air-flow transducer according to claim 1, wherein the detector at the receiving station comprises:

an electrode in the form of a noncircular grid embedded in an insulating ring at a predetermined number of points, said non-circular grid having a larger mesh than that of the shielding grids.

3. An ionic air-flow transducer for measuring the transit time of a stream of ionized particles between an emission station and a receiving station respectively associated with a high-voltage pulse generator and a detector, wherein a triggering mechanism, a shaping circuit and a control circuit related to the position of an engine crankshaft is used to obtain an electrical signal which depends on average volume flow (Qv), comprising:

the receiving station including shielding and flow regulation means which passes said stream of ionized particles and is disposed upstream and downstream of said detector for shielding said detector and regulating said air flow;

means for moving said detector and associated shielding and flow regulating means with respect to the direction of the stream of ionized particles; and a shaping detector coupled to said detector for producing an output indicating passage of said ionized particle stream, including means for generating a time lapse ($\Delta t$) with respect to the measurement of transit time of said stream of ionized particles between the emission station and receiving station making it possible to linearize the curve $1/t = f/(Qv)$.

4. An ionic air-flow transducer according to any of claims 1, 2 or 3, wherein said control circuit comprises:

means for measuring pulsated flow at particular instants which correspond to the passage of the volume flow at an average value.

5. An ionic air-flow transducer according to claim 4 wherein said control circuit comprises:

means for generating, between the position of the crankshaft and the instant of measurement of average flow, a retard angle $\phi$, wherein $\phi = -\phi_o + kN$, wherein $\phi_o$ is a constant angle, N is the engine velocity and k is a constant.

6. An ionic air-flow transducer according to claim 5, wherein said control circuit comprises:

a transducer coupled to the crankshaft by a constant angle ($\phi_o$); and plural monostable electronic components for producing a constant retard angle $t_o$, equivalent to KN.

* * * * *